(12) United States Patent
Oh

(10) Patent No.: US 10,564,054 B2
(45) Date of Patent: Feb. 18, 2020

(54) DEVICE FOR INDICATING REPLACEMENT TIME OF COMPOSITE LEAF SPRING

(71) Applicants: HYUNDAI MOTOR COMPANY, Seoul (KR); KIA MOTORS CORPORATION, Seoul (KR)

(72) Inventor: Seung Hyun Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 15/827,986

(22) Filed: Nov. 30, 2017

(65) Prior Publication Data

US 2019/0017882 A1 Jan. 17, 2019

(30) Foreign Application Priority Data

Jul. 12, 2017 (KR) .................. 10-2017-0088212

(51) Int. Cl.
*B60G 17/018* (2006.01)
*B60G 11/02* (2006.01)
(Continued)

(52) U.S. Cl.
CPC .............. *G01L 1/044* (2013.01); *B60G 11/04* (2013.01); *B60G 17/0185* (2013.01); *F16F 1/368* (2013.01); *G01B 5/30* (2013.01); *G01L 5/22* (2013.01); *B60G 11/02* (2013.01); *B60G 2202/112* (2013.01); *B60G 2206/428* (2013.01); *B60G 2206/7101* (2013.01); *B60G 2600/04* (2013.01); *B60G 2600/042* (2013.01);
(Continued)

(58) Field of Classification Search
CPC .... B60G 11/04; B60G 17/0185; B60G 11/02; B60G 2202/112; B60G 2206/428; B60G 2206/7101; B60G 2600/04; B60G 2600/042; B60G 2600/044; B60G 2800/80; F16F 1/368; F16F 1/18; F16F 1/3686; G01B 5/30; G01L 1/044; G01L 5/22; B32B 27/08; B61F 15/20; B61F 5/30; B61F 5/52; G01N 27/041; G01N 27/20; G07C 5/0808; H01L 41/183; Y10T 29/49611; Y10T 29/49826; Y10T 29/49801; Y10T 29/5145
See application file for complete search history.

(56) References Cited

U.S. PATENT DOCUMENTS 4,171,592 A * 10/1979 Saitoh ................. A63H 30/04
446/456
4,471,566 A * 9/1984 Ishimoto ............. A63H 17/36
446/129

(Continued)

FOREIGN PATENT DOCUMENTS

KR 10-1201954 B1 11/2012
KR 10-2013-0061904 A 6/2013
KR 10-2017-0041019 A 4/2017

*Primary Examiner* — Lisa M Caputo
*Assistant Examiner* — Brandi N Hopkins
(74) *Attorney, Agent, or Firm* — Morgan, Lewis & Bockius LLP

(57) ABSTRACT

A device for indicating a replacement time of a composite leaf spring constantly monitors durability of the composite leaf spring, which is formed by mixing unidirectional glass fiber and epoxy resin, and informs a driver of an appropriate replacement time of the composite leaf spring based on the monitoring result.

7 Claims, 4 Drawing Sheets

(51) Int. Cl.
  *G01L 1/04*       (2006.01)
  *G01L 5/22*       (2006.01)
  *G01B 5/30*       (2006.01)
  *F16F 1/368*      (2006.01)
  *B60G 17/0185*    (2006.01)
  *B60G 11/04*      (2006.01)
(52) U.S. Cl.
  CPC .. *B60G 2600/044* (2013.01); *B60G 2800/802* (2013.01); *F16F 2230/24* (2013.01)

(56) References Cited

U.S. PATENT DOCUMENTS

| | | |
|---|---|---|
| 5,015,842 A | 5/1991 | Fradenburgh et al. |
| 9,765,838 B2 * | 9/2017 | Glover .................... F16F 1/368 |
| 2009/0057495 A1 * | 3/2009 | Beaman .................. B61L 23/00 |
| | | 246/1 C |

* cited by examiner

DEVICE FOR INDICATING REPLACEMENT TIME OF COMPOSITE LEAF SPRING

CROSS-REFERENCE TO RELATED APPLICATION

This application is based on and claims the benefit of priority to Korean Patent Application No. 10-2017-0088212, filed on Jul. 12, 2017, in the Korean Intellectual Property Office, the disclosure of which is incorporated herein by reference.

TECHNICAL FIELD

The present disclosure relates to a device for indicating the replacement time of a composite leaf spring, and more particularly to a device for constantly monitoring the durability of a composite leaf spring, which is formed in a unitary body and used instead of a leaf spring constituted by multiple steel plates in a suspension device for a two-shaft structure for supporting rear wheels, and informing a driver of the appropriate replacement time of the composite leaf spring based on the monitoring result.

BACKGROUND

A large truck, such as a dump truck, has a two-shaft structure for supporting the rear wheels in order to evenly support a load, particularly while traveling on a rough unpaved road.

A rear-wheel suspension device of a large truck, which has a two-shaft structure for supporting the rear wheels, includes a pair of rubber springs, which are mounted to a rear-wheel front axle and a rear-wheel rear axle, and a leaf spring, which extends in the forward-and-backward direction such that two opposite ends thereof are connected to the rubber springs.

A trunnion base, which includes a trunnion shaft, is provided at the middle in the longitudinal direction of the leaf spring. The trunnion base is coupled to a vehicle body frame, and a U-bolt saddle (an under saddle or a lower saddle) is rotatably coupled to the trunnion shaft and coupled to the middle portion of the leaf spring, together with a spring bracket (an upper saddle), by fastening U-bolts and nuts, in order to fixedly support the middle portion of the leaf spring.

The leaf spring may be constituted by multiple steel plates, or may alternatively be embodied as a composite leaf spring, which is formed in a unitary body containing glass fiber or carbon fiber. The leaf spring, which is constituted by multiple steel plates, is advantageous in terms of high durability for a given price, and the composite leaf spring is advantageous in terms of reduction in weight and improvement of fuel efficiency.

In the case of the leaf spring constituted by multiple steel plates, the steel plates crack and make a loud noise as the durability thereof deteriorates, making it possible for a user to be easily aware of the replacement time and to easily monitor the progression of cracks with naked eyes.

However, the composite leaf spring is damaged as the durability thereof deteriorates in a manner such that delamination, that is, separation of layers occurs one by one from the outermost layer of the top surface or the bottom surface of the composite leaf spring toward the inner layers. Therefore, the driver is not able to easily recognize the replacement time of the composite leaf spring auditorily or visually, which causes frequent occurrence of accidents attributable to damage to the composite leaf spring.

The information disclosed in this Background section of the disclosure is only for enhancement of understanding of the general background of the invention and should not be taken as an acknowledgement or any form of suggestion that this information forms the prior art already known to a person skilled in the art.

SUMMARY

Therefore, the present disclosure has been made in view of the above problems, and an object of the present disclosure is to provide a device for indicating a replacement time of a composite leaf spring, which is capable of constantly monitoring the durability of a composite leaf spring, which is formed by mixing unidirectional glass fiber and epoxy resin and used in a suspension device for a two-shaft structure for supporting the rear wheels, and informing a driver of an appropriate replacement time of the composite leaf spring based on the monitoring result, thereby preventing the occurrence of an accident attributable to fracture of the composite leaf spring.

In accordance with the present disclosure, the above and other objects can be accomplished by providing a device that indicates the replacement time of a composite leaf spring formed by mixing unidirectional glass fiber and epoxy resin, the device including a current transmitter and a current receiver provided at respective opposite ends of the composite leaf spring, a controller for determining a present state of the composite leaf spring by comparing an amount of current applied to the current transmitter with an amount of current detected by the current receiver, and an informing device for indicating a present state of the composite leaf spring under control of the controller.

The composite leaf spring may include multiple layers of the unidirectional glass fiber, which extend in a longitudinal direction of the composite leaf spring and are stacked one on another along a thickness in the vertical direction of the composite leaf spring, and the current transmitter and the current receiver may be connected to respective opposite ends of each of the multiple layers of the unidirectional glass fiber.

The current transmitter may include an intermediate transmitter disposed at a middle of a thickness in the vertical direction of one end of the composite leaf spring, an upper transmitter disposed above the intermediate transmitter, and a lower transmitter disposed below the intermediate transmitter, and the current receiver may include an intermediate receiver disposed at a middle of a thickness in the vertical direction of the remaining end of the composite leaf spring and electrically connected to the intermediate transmitter, an upper receiver disposed above the intermediate receiver and electrically connected to the upper transmitter, and a lower receiver disposed below the intermediate receiver and electrically connected to the lower transmitter.

Upon determining that there is a difference between the amount of current applied to the current transmitter and the amount of current detected by the current receiver, the controller may determine that at least a portion of the composite leaf spring has been fractured.

The controller may control the operation of the informing device such that the informing device generates different kinds of alarm signals in accordance with a magnitude of the difference between the amount of current applied to the current transmitter and the amount of current detected by the current receiver.

The controller may be configured to independently monitor a current signal between the intermediate transmitter and the intermediate receiver, a current signal between the upper transmitter and the upper receiver, and a current signal between the lower transmitter and the lower receiver, and the informing device may be configured to indicate a fractured position of the composite leaf spring based on the monitoring result of the controller. The fractured position to be indicated may be divided into a middle portion, an upper portion and a lower portion of the thickness in the vertical direction of the composite leaf spring.

The informing device may have a function of informing a driver of the present state of the composite leaf spring using an auditory device and a visual device together.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
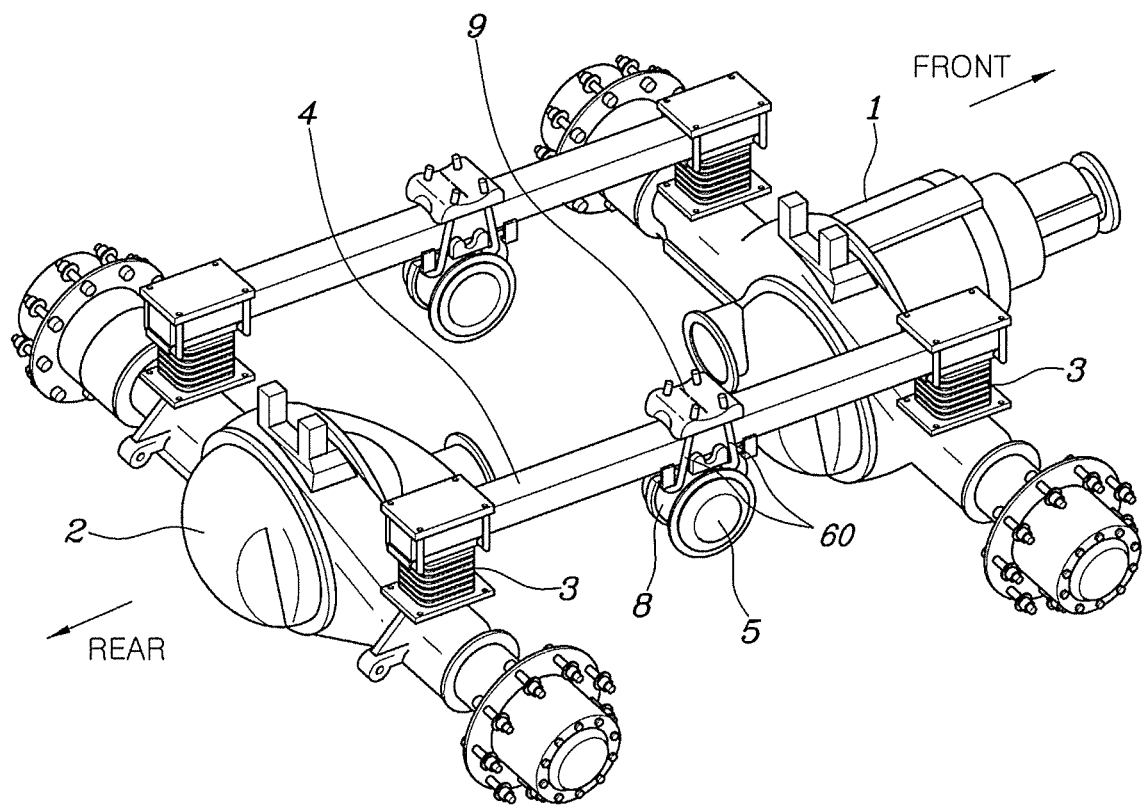
FIGS. 1 and 2 are views of a suspension device for a two-shaft structure for supporting rear wheels, which includes a composite leaf spring.
Figure 2:
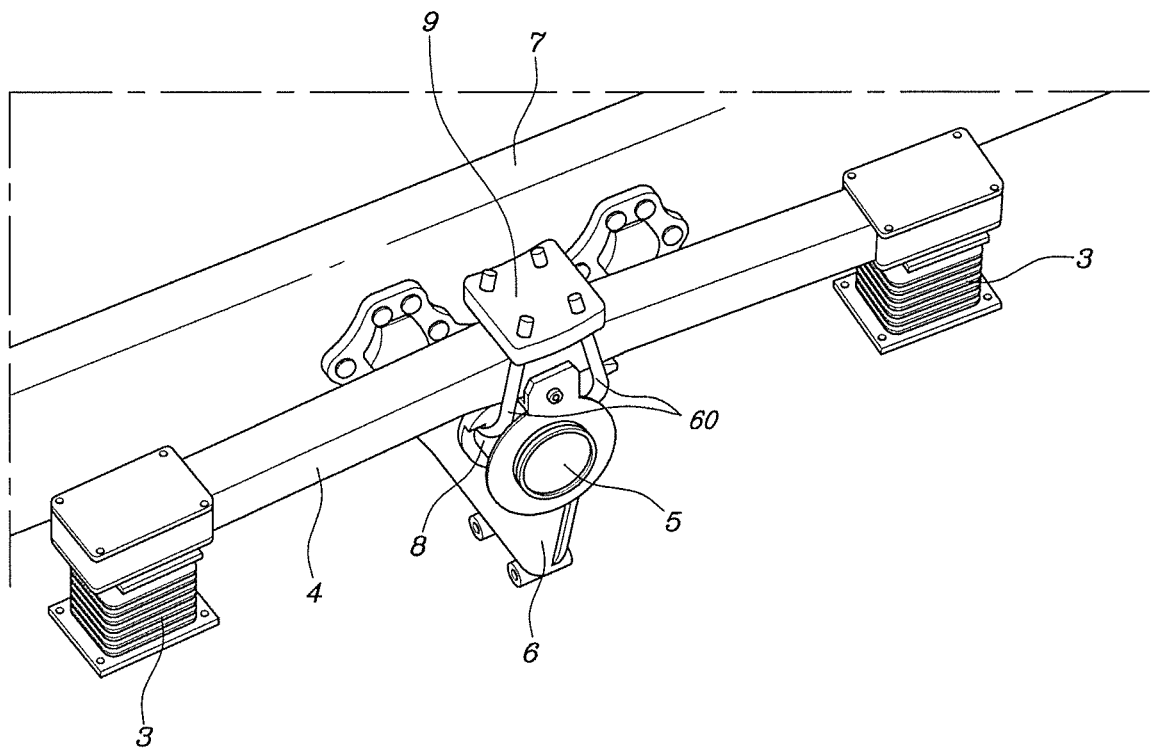

A rear-wheel suspension device of a large truck, which has a two-shaft structure for supporting the rear wheels, as shown in FIGS. 1 and 2, includes a pair of rubber springs 3, which are mounted to a rear-wheel front axle 1 and a rear-wheel rear axle 2, and a composite leaf spring 4, which extends in the forward-and-backward direction so that two opposite ends thereof are connected to the rubber springs 3.

The composite leaf spring 4 is formed in a unitary body by mixing unidirectional glass fiber and epoxy resin.

A trunnion base 6, which includes a trunnion shaft 5, is provided at the middle in the longitudinal direction of the composite leaf spring 4. The trunnion base 6 is coupled to a vehicle body frame 7, and a U-bolt saddle 8 is rotatably coupled to the trunnion shaft 5 and is coupled to the middle portion of the composite leaf spring 4, together with a spring bracket 9, by fastening U-bolts 60 and nuts, in order to fixedly support the middle portion of the composite leaf spring 4.

In the suspension device for a two-shaft structure for supporting the rear wheels, in the case in which the leaf spring is constituted by multiple steel plates, the steel plates of the leaf spring crack and make a loud noise as the durability thereof deteriorates, making it possible for a user to be easily aware of the replacement time and to easily monitor the progression of cracks with the naked eye. Therefore, the occurrence of an accident attributable to fracture of the leaf spring is prevented as much as possible.

However, the composite leaf spring 4 is damaged as the durability thereof deteriorates in a manner such that delamination occurs, that is, separation of layers occurs one by one from the outermost layer of the top surface or the bottom surface of the composite leaf spring 4 toward the inner layers. Therefore, the driver is incapable of easily recognizing the replacement time of the composite leaf spring 4 auditorily or visually, which causes frequent occurrence of accidents attributable to damage to the composite leaf spring 4.

The present disclosure is characterized in that the driver is easily made aware of damage to the composite leaf spring 4, which is formed by mixing unidirectional glass fiber 4a and epoxy resin 4b, thereby preventing the occurrence of an accident attributable to damage to the composite leaf spring 4 as much as possible. To this end, the embodiment of the present disclosure includes a current transmitter 10 and a current receiver 20, which are provided at respective opposite ends of the composite leaf spring 4, a controller 30, which determines the present state of the composite leaf spring 4 by comparing the amount of current applied to the current transmitter 10 with the amount of current detected by the current receiver 20, and an informing device 40, which indicates the present state of the composite leaf spring 4 under the control of the controller 30.

The controller 30 is an electric circuitry that executes instructions of software which thereby performs various functions described hereinafter.

A power supply 50 is electrically connected to the current transmitter 10 in order to supply current to the current transmitter 10, and the operation of the power supply 50 is controlled by the controller 30.

Multiple layers of unidirectional glass fiber 4a extend in the longitudinal direction of the composite leaf spring 4 and are stacked one on another along the thickness t in the vertical direction of the composite leaf spring 4. The current transmitter 10 and the current receiver 20 are connected to respective opposite ends of each of the layers of the unidirectional glass fiber 4a.

The current transmitter 10 includes an intermediate transmitter 11, an upper transmitter 12 and a lower transmitter 13. The current receiver 20 includes an intermediate receiver 21, an upper receiver 22 and a lower receiver 23.

The intermediate transmitter 11 and the intermediate receiver 21 are disposed at the middle of the thickness t in the vertical direction of the composite leaf spring 4 and are electrically connected to each other. The upper transmitter 12 and the upper receiver 22 are disposed above the intermediate transmitter 11 and the intermediate receiver 21 and are electrically connected to each other. The lower transmitter 13 and the lower receiver 23 are disposed below the intermediate transmitter 11 and the intermediate receiver 21 and are electrically connected to each other.

Each of the upper transmitter 12 and the upper receiver 22 and each of the lower transmitter 13 and the lower receiver 23 may be provided in a singular number or a plural number.

Upon determining that there is no difference between the amount of current applied to the current transmitter 10 and the amount of current detected by the current receiver 20, the controller 30 determines that the composite leaf spring 4 is in a normal state, that is, is not fractured.

Upon determining that there is a difference between the amount of current applied to the current transmitter 10 and the amount of current detected by the current receiver 20, the controller 30 determines that the composite leaf spring 4 is in an abnormal state, that is, that at least a portion of the composite leaf spring 4 has been fractured. In particular, the greater the difference between the amount of current applied to the current transmitter 10 and the amount of current detected by the current receiver 20, the more severe the fractured state of the composite leaf spring 4 is determined to be.

The controller 30 controls the operation of the informing device 40 in accordance with the present state of the composite leaf spring 4 so that the driver or passenger can be informed of the present state of the composite leaf spring 4.

Described in detail, when the composite leaf spring 4 is in a normal state, the controller 30 performs control such that the informing device 40 indicates that the composite leaf spring 4 is in a normal state and that the vehicle is in an operational state. When the composite leaf spring 4 is in a partially fractured state, the controller 30 performs control such that the informing device 40 indicates that the composite leaf spring 4 is in a partially fractured state but that the vehicle remains in an operational state. When the composite leaf spring 4 is in a severely fractured state, the controller 30 performs control such that the informing device 40 indicates that the composite leaf spring 4 is in a severely fractured state and that immediate stoppage of the vehicle is needed.

Although the present state of the composite leaf spring 4 has been described as being classified into only three cases, namely, a normal state, a partially fractured state and a severely fractured state, the embodiment is not limited thereto, and the number of cases may vary.

The controller 30 controls the operation of the informing device 40 such that the informing device 40 generates different kinds of alarm signals in accordance with the magnitude of the difference between the amount of current applied to the current transmitter 10 and the amount of current detected by the current receiver 20. For example, if the difference between the amount of current applied to the current transmitter 10 and the amount of current detected by the current receiver 20 is relatively large, the controller 30 controls the operation of the informing device 40 such that the informing device 40 generates an alarm signal that can be immediately recognized by the driver so as to strongly alert the driver to the possibility of accident.

The controller 30 is configured to independently monitor the current signal between the intermediate transmitter 11 and the intermediate receiver 21, the current signal between the upper transmitter 12 and the upper receiver 22, and the current signal between the lower transmitter 13 and the lower receiver 23. The informing device 40 is configured to indicate the fractured position of the composite leaf spring 4 based on the result of monitoring by the controller 30. The fractured position to be indicated is divided into a middle portion, an upper portion and a lower portion of the thickness t in the vertical direction of the composite leaf spring 4.

The informing device 40 has a function of informing the driver or passenger of the present state of the composite leaf spring 4 using an auditory device and a visual device together, which may include various devices such as, for example, a display device, an alarm device or the like.

Figure 3:
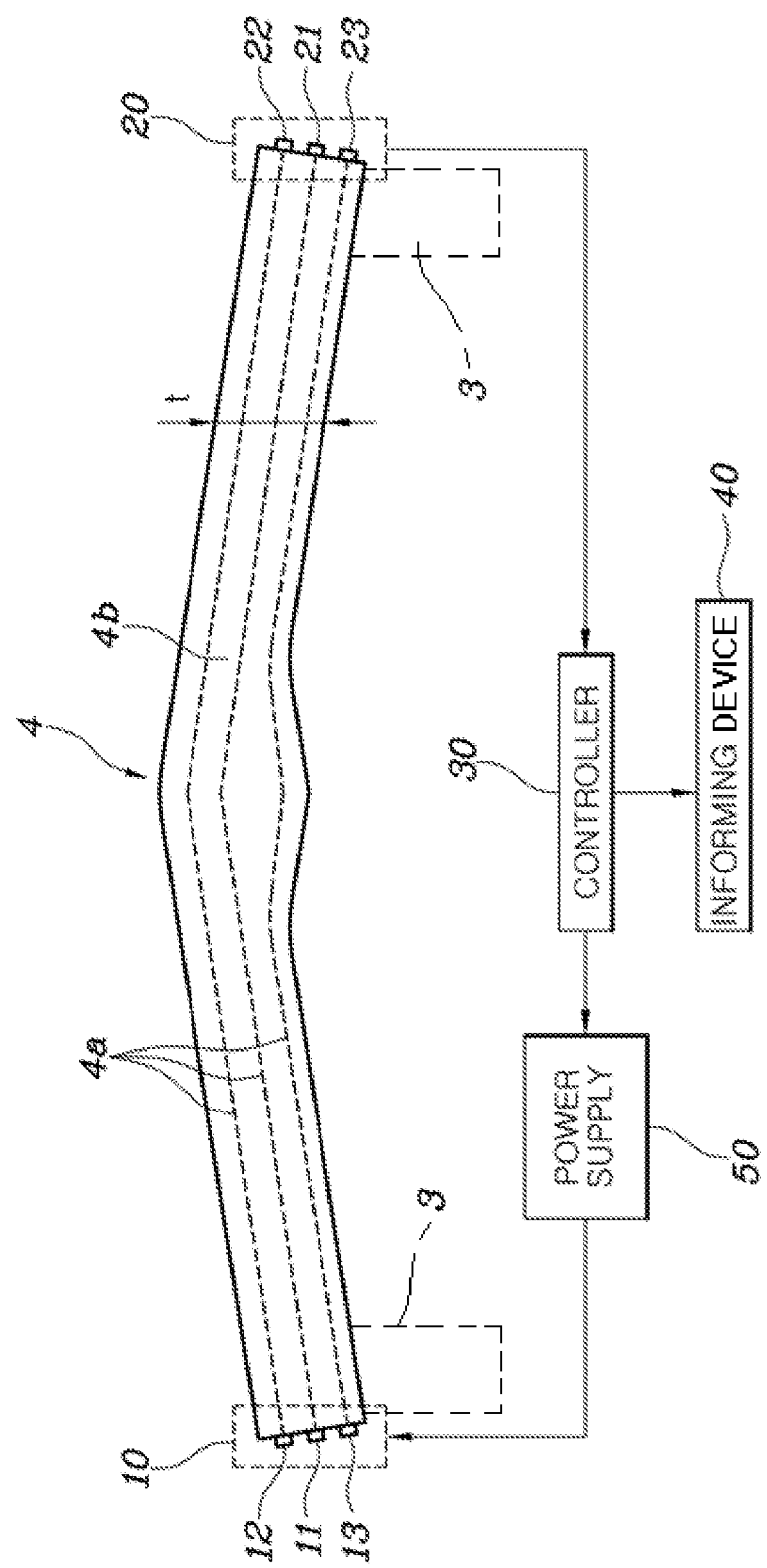
FIG. 3 is a view for explaining a device for indicating the replacement time of a composite leaf spring according to an embodiment of the present disclosure.
Figure 4:
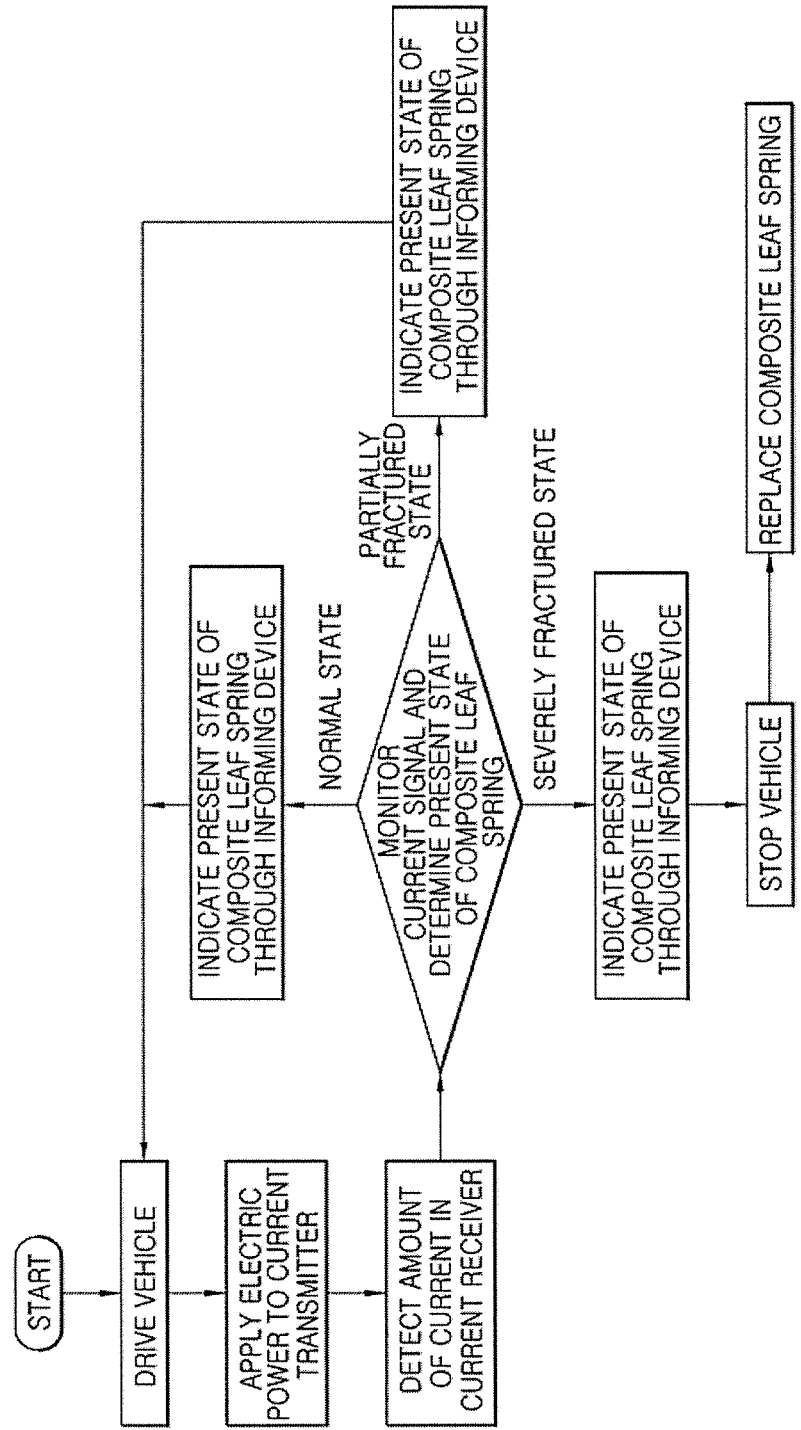
FIG. 4 is a flow chart for explaining actions of a device for indicating the replacement time of a composite leaf spring according to an embodiment of the present disclosure.

Hereinafter, the operation of the embodiment of the present disclosure will be described with reference to FIGS. 3 and 4.

The composite leaf spring 4 is damaged as the durability thereof deteriorates in a manner such that delamination occurs, that is, separation of layers occurs one by one from the outermost layer of the top surface or the bottom surface of the composite leaf spring 4 toward the inner layers, and finally the middle portion of the thickness t in the vertical direction of the composite leaf spring 4 is fractured.

Therefore, when the vehicle is started and electric power is applied to the current transmitter 10 while traveling, the controller 30 monitors and compares the amount of current applied to the current transmitter 10 and the amount of current detected by the current receiver 20 in real time, determines the present state of the composite leaf spring 4 based on the comparison result, and controls the informing device 40 so that the informing device 40 informs the driver or passenger of the situation corresponding to the present state of the composite leaf spring 4.

Described in detail, upon determining that the amount of current a applied to the current transmitter 10 and the amount of current b detected by the current receiver 20 are the same, the controller 30 determines that the composite leaf spring 4 is in a normal state, that is, is not fractured, and performs control such that the informing device 40 informs the driver of the situation corresponding to this determination result using an auditory device and a visual device together.

Meanwhile, upon determining that the amount of current a applied to the current transmitter 10 and the amount of current b detected by the current receiver 20 are different, that is, that the amount of current b is smaller than the amount of current a, the controller 30 determines that a fracture has occurred in the composite leaf spring 4.

When it is determined that a fracture has occurred, if the difference between the amount of current a and the amount of current b is relatively small (is within a predetermined range), the controller 30 determines that the composite leaf spring 4 is in a partially fractured state and performs control such that the informing device informs the driver of the situation corresponding to this determination result using an auditory device and a visual device together and also indicates that the vehicle remains in an operational state.

The controller 30 monitors the current signal (a first signal) between the intermediate transmitter 11 and the intermediate receiver 21, the current signal (a second signal) between the upper transmitter 12 and the upper receiver 22, and the current signal (a third signal) between the lower transmitter 13 and the lower receiver 23 in real time. If at least one of the second signal and the third signal is not generated, the controller 30 determines that the composite leaf spring 4 is in a partially fractured state, and the informing device 40 indicates the fractured position of the composite leaf spring 4. At this time, the fractured position to be indicated is divided into a middle portion, an upper portion and a lower portion of the thickness t in the vertical direction of the composite leaf spring 4.

Meanwhile, when it is determined that a fracture has occurred, if the difference between the amount of current a and the amount of current b is relatively large (is beyond a predetermined range), the controller 30 determines that the composite leaf spring 4 is in a severely fractured state and performs control such that the informing device 40 informs the driver of the situation corresponding to this determination result using an auditory device and a visual device together, and also indicates that immediate stoppage of the vehicle is needed.

The severely fractured state of the composite leaf spring 4 refers to the situation in which the current signal (the first signal) between the intermediate transmitter 11 and the intermediate receiver 21 is not generated or is intermittently generated. This state is a state in which the composite leaf spring 4 is expected to be completely fractured soon. At this time, the informing device 40 indicates that immediate stoppage of the vehicle is needed for passengers' safety, making it possible for the driver to recognize the warning information, immediately stop the vehicle, and effect replacement of the composite leaf spring 4.

As is apparent from the above description, a device for indicating the replacement time of a composite leaf spring according to the embodiment of the present disclosure is capable of constantly monitoring the durability of the composite leaf spring, which is formed by mixing unidirectional glass fiber and epoxy resin, and informing a driver of a present state of the composite leaf spring and the appropriate replacement time thereof based on the monitoring result, thereby preventing the occurrence of an accident attributable to fracture of the composite leaf spring.

Although the preferred embodiment of the present disclosure has been disclosed for illustrative purposes, those skilled in the art will appreciate that various modifications, additions and substitutions are possible, without departing from the scope and spirit of the invention as disclosed in the accompanying claims.

What is claimed is:

1. A device for indicating a replacement time of a composite leaf spring, formed by mixing unidirectional glass fiber and epoxy resin, the device comprising:
   a current transmitter and a current receiver disposed at respective opposite ends of the composite leaf spring;
   a controller for determining a present state of the composite leaf spring by comparing an amount of current applied to the current transmitter with an amount of current detected by the current receiver; and
   an informing device for indicating a present state of the composite leaf spring under control of the controller.

2. The device according to claim 1, wherein the composite leaf spring includes multiple layers of the unidirectional glass fiber, the multiple layers of the unidirectional glass fiber extending in a longitudinal direction of the composite leaf spring and being stacked one on another along a thickness in a vertical direction of the composite leaf spring, and
   the current transmitter and the current receiver are connected to respective opposite ends of each of the multiple layers of the unidirectional glass fiber.

3. The device according to claim 1, wherein the current transmitter includes an intermediate transmitter disposed at a middle of a thickness in a vertical direction of one end of the composite leaf spring, an upper transmitter disposed above the intermediate transmitter, and a lower transmitter disposed below the intermediate transmitter, and
   the current receiver includes an intermediate receiver disposed at a middle of a thickness in a vertical direction of a remaining end of the composite leaf spring and electrically connected to the intermediate transmitter, an upper receiver disposed above the intermediate receiver and electrically connected to the upper transmitter, and a lower receiver disposed below the intermediate receiver and electrically connected to the lower transmitter.

4. The device according to claim 3, wherein the controller is configured to independently monitor a current signal between the intermediate transmitter and the intermediate receiver, a current signal between the upper transmitter and the upper receiver, and a current signal between the lower transmitter and the lower receiver, and
   the informing device is configured to indicate a fractured position of the composite leaf spring based on a monitoring result of the controller, the fractured position to be indicated being divided into a middle portion, an upper portion and a lower portion of the thickness in the vertical direction of the composite leaf spring.

5. The device according to claim 1, wherein, upon determining that there is a difference between the amount of current applied to the current transmitter and the amount of current detected by the current receiver, the controller determines that at least a portion of the composite leaf spring has been fractured.

6. The device according to claim 5, wherein the controller controls operation of the informing device such that the informing device generates different kinds of alarm signals in accordance with a magnitude of the difference between the amount of current applied to the current transmitter and the amount of current detected by the current receiver.

7. The device according to claim 1, wherein the informing device has a function of informing a driver of the present state of the composite leaf spring using an auditory device and a visual device together.

\* \* \* \* \*